United States Patent [19]

Kosikowski

[11] Patent Number: 4,925,011

[45] Date of Patent: May 15, 1990

[54] METHOD AND APPARATUS FOR CONVEYING PLATE-LIKE PARTS OF DIFFERENT THICKNESS

[75] Inventor: Thomas Kosikowski, Burgthann, Fed. Rep. of Germany

[73] Assignee: Schering Aktiengesellschaft, Berlin and Bergkamen, Fed. Rep. of Germany

[21] Appl. No.: 362,330

[22] Filed: Jun. 6, 1989

[30] Foreign Application Priority Data

Jun. 6, 1988 [DE] Fed. Rep. of Germany ....... 3819570

[51] Int. Cl.[5] ............................................ B65G 29/00
[52] U.S. Cl. .................................... 198/624; 226/187; 226/188
[58] Field of Search ........................ 198/624; 83/156; 144/246 R, 246 A, 246 D, 247, 248; 226/176, 177, 181, 186–188; 271/272–274

[56] References Cited

U.S. PATENT DOCUMENTS 3,206,782  9/1965  Larsen ................................. 226/188
3,643,848  2/1972  Haller ................................. 226/186
4,015,703  4/1977  Keller ................................. 198/624

*Primary Examiner*—Joseph E. Valenza
*Attorney, Agent, or Firm*—Michael J. Striker

[57] ABSTRACT

The apparatus for conveying plate-like parts, especially circuit boards, of varying thickness, comprises an upper roller and an associated lower roller between which the plate-like objects are fed, and a gear-tooth system, connecting the lower roller with the upper roller, by which the lower roller drives the upper roller. So that the apparatus operates optimally even with substantially thicker than usual objects, the gear-tooth system is structured to maintain a constant axial spacing between the lower roller and the upper roller. The upper roller with its gear teeth is mounted with an upper roller bearing in a circular arc-shaped coulisse, and the arc center point of the circular arc-shaped coulisse is positioned at a bearing center point for the lower roller, so that the radius of the circular arc-shaped coulisse corresponds to the axial spacing of the gear system. A method for conveying plate-like parts of varying thickness is also described.

9 Claims, 2 Drawing Sheets

METHOD AND APPARATUS FOR CONVEYING PLATE-LIKE PARTS OF DIFFERENT THICKNESS

BACKGROUND OF THE INVENTION

My invention relates to a method of conveying plate-like objects or parts of very different thickness, especially circuit boards. It also relates to an apparatus for conveying plate-like objects according to my method.

In a horizontal continuous production process circuit boards are subjected to different treatments, e.g. brushing, etching, cleaning, and rinsing, and so forth.

In the process, the circuit boards are conveyed in a horizontal orientation through a plurality of treatment stations. One such assembly line comprises at least one activating station and one or two rinsing stations.

The conveying of the plate-like parts or objects typically occurs by a plurality of rollers, which are cylindrical or can comprise comparatively thin axles with individually mountable disks. The rollers are put in rotation by drive.

For treatment of the circuit boards with fluid, which is sprayed against the plate-like objects from above and below, the plate-like objects must be fed through the upper and lower rollers.

If they contact on the lower rollers, they can be lifted from these conveying elements by action of the spray pressure so that disturbances or interruptions of the conveying process occur. For guarantee of reliable transport, the upper conveying element can be similarly driven.

With the apparatus and method used currently the lower rollers are driven by bevel or cone gear pairs mounted or driven by a drive shaft running in the longitudinal direction of the apparatus. The drive gear on the upper rollers comprises a straight-toothed bevel on at least one end of the rollers. Thus, the bearings of the upper rollers are guided in vertical slots, so that the axial spacing can be adjusted to the different thicknesses of the circuit boards to be treated.

Because of the weight of the upper conveying elements, these upper conveying elements are continuously pulled downwardly.

The structure of the gearing between the upper and the lower roller is advantageously chosen so that with the standard thickness of the circuit boards to be treated an ideal axial spacing results.

For all other plate-like object thicknesses or while operating empty, the axial spacing is set incorrectly and the gear system does not operate optimally.

Recently however, the differences between the thinnest and the thickest circuit boards have increased. Particularly because of the ever more prevalent multilayering, both foil-like and also very thick circuit boards are to be treated with these machines. While the maximum thickness is now about 5 mm, from now on it will also be necessary to treat plate-like objects which are up to about a 10 mm thickness. This is no longer possible with the above-described performance of the gearing between the upper and the lower roller. Also, an adjustment may be necessary with the variable spacing between the upper and lower rollers. So that with the thickest plate-like objects the gears should still mesh properly, a correspondingly large module of the gear system must be chosen. This, however, is not possible, because then with the given maximum allowed outer- and/or pitch diameter, the smallest possible tooth number is not attained.

SUMMARY OF THE INVENTION

Accordingly, it is an object of my invention to provide a method for conveying a plate-like object, especially a circuit board, in a continuous process which is satisfactory for a wide range of different object thicknesses up to 10 mm.

It is another object of my invention to provide an apparatus for conveying a plate-like object, especially a circuit board, of variable thickness in a horizontal direction which operates more efficiently than the current apparatus and satisfactorily for a wider range of object thicknesses.

In keeping with these objects and with others which will become apparent hereinafter, my method for conveying a plate-like object, especially a circuit board, having a variable thickness in a substantially horizontal continuous treatment process, comprises feeding or guiding the plate-like object between an upper roller and an associated lower roller, the upper roller being driven by the associated lower roller by a gear-tooth system, maintaining a constant axial spacing between the upper roller and the lower roller, and constraining the upper roller to follow a circular-arc shaped path to adjust to different thicknesses of the plate-like object, the arc center point of the circular arc-shaped path being coincident with a bearing center point of the lower roller. It can further advantageously comprise the step of urging the upper roller continuously downward by a spring element.

Using my method, no adjustments need be performed between processing circuit boards of different thicknesses, and an optimum apparatus operation efficiency can be attained.

Also, in keeping with the above objects, my apparatus for continuously conveying a plate-like object, especially a circuit board, having a variable allowed thickness in a substantially horizontal direction comprises an upper roller, having an upper roller bearing, and an associated lower roller, having a lower roller bearing with a bearing center point between which the plate-like object is guided and a gear-tooth system having a plurality of gear teeth for driving the upper roller by the lower roller. The gear-tooth system is structured to provide a constant axial spacing between the lower roller and the upper roller. The apparatus further comprises a circular arc-shaped coulisse, having an arc center point and an arc radius, the upper roller bearing of the upper roller being mounted in a circular arc-shaped coulisse. The arc center point is positioned at a bearing center point of the lower roller, and the arc radius corresponds to the axial spacing of the gear-tooth system.

The coulisse is advantageously structured, so that the upper roller tends to take its lowest allowed position by its own weight, and the upper roller and the lower roller need not always be entirely vertically above each other. Alternatively, the upper roller is urged to its lowest allowed position by a spring element connected with it.

The gear-tooth system between the lower roller and the upper roller can be engaged with one end or both ends of the rollers.

Advantageously, my apparatus comprises a single additional lower roller mounted directly downstream from the lower roller in the horizontal direction for processing the circuit board. The upper roller bearing can be mounted in a pivotable lever whose pivot point is identical with the bearing center point of the lower roller.

BRIEF DESCRIPTION OF THE DRAWING

The objects, features and advantages of my invention will be made more apparent from the following detailed description, reference being made to the accompanying drawing in which.

DETAILED DESCRIPTION OF THE INVENTION

Figure 1:
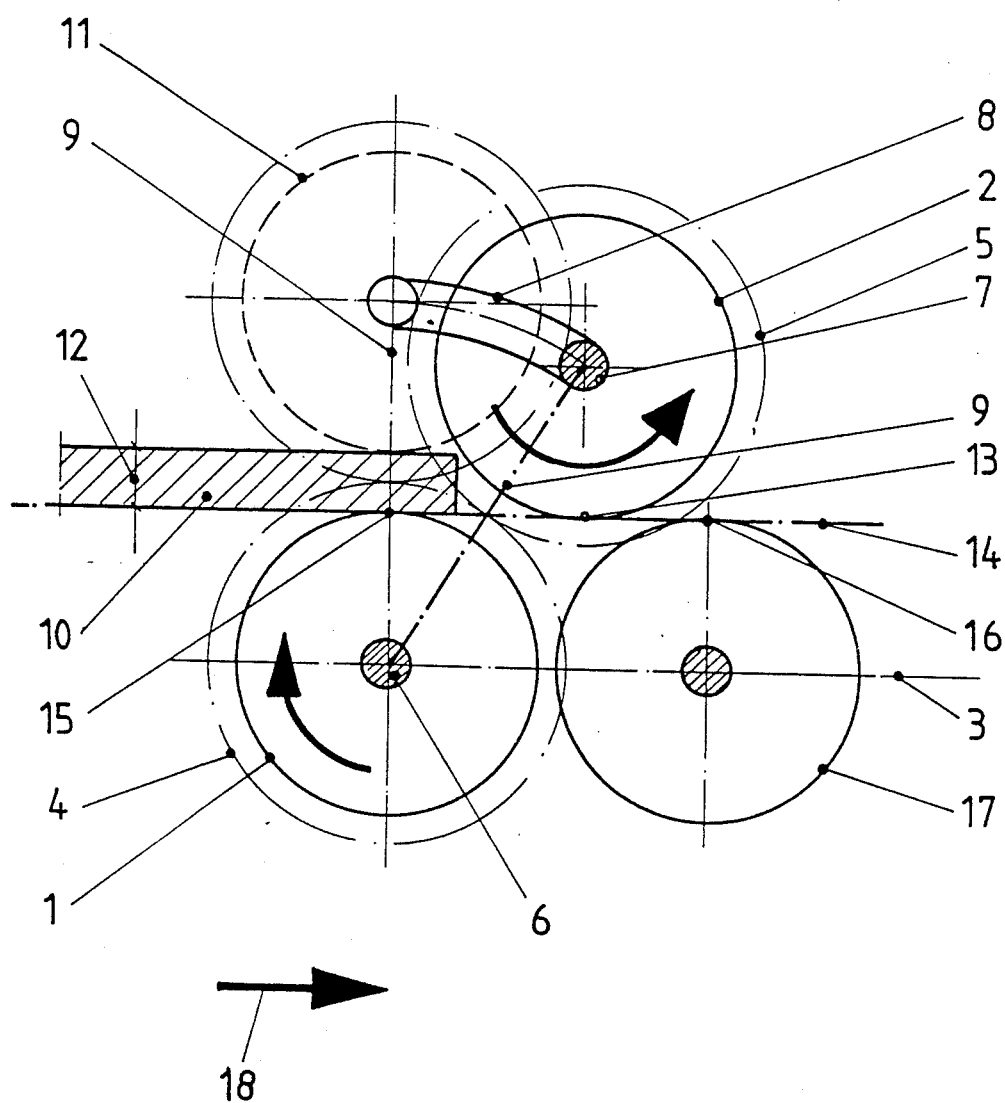
FIG. 1 is a schematic side view of an apparatus for conveying plate-like parts or objects of very different thickness, according to the method of our invention.

FIG. 1 shows a portion of an apparatus for conveying plate-like parts, having a lower roller 1 and an upper roller 2. The lower roller 1 is driven by a gear system on a drive shaft 3 which extends in the plane of the center line between the centers of the rollers 1 and 17. The gear on the upper roller 2 comprises a straight bevel gear with the pitch diameters 4 and 5. The bearing 7 of the upper roller 2, however, can change its position inside a coulisse 8. However, the coulisse 8 is formed and/or positioned so that the axial spacing or distance 9 between the bearing axes or center points 6', and 7', of the upper bearing 7 and the lower bearing 6 remains constant.

The arc-shaped coulisse 8 has a radius R and an arc center point RP. The arc center point RP is coincident in the embodiment of FIG. 1, with the center point 6', of the lower roller bearing 6, and the radius R corresponds to the axial spacing 9.

When plate-like objects 12, e.g. circuit boards, are conveyed between the lower roller 1 and the upper roller 2, the upper roller 2 takes a position 11, in which the spacing 9 between the outer diameters of the rollers 1 and 2 corresponds to the thickness 12. The upper roller 2 rises easily on the circuit board 10 by its rotary motion, while the spacing 9 does not change because it is constrained to move in the coulisse 8. The coulisse 8 is formed so that the lowest point 13 of the outer diameter of the roller 2 is not or is only slightly lower than the connecting line 14 between the highest points 15 and 16 of the rollers 1 and 17. Because of that, it is guaranteed that very thin plates are not deformed during conveying by the apparatus performing the method according to my invention.

The additional roller 17 is positioned as closely as possible downstream of the roller 1 relative to the conveying direction 18 of the circuit board 10 and supports the circuit board 10 additionally against the weight of the upper roller 2.

Figure 2:
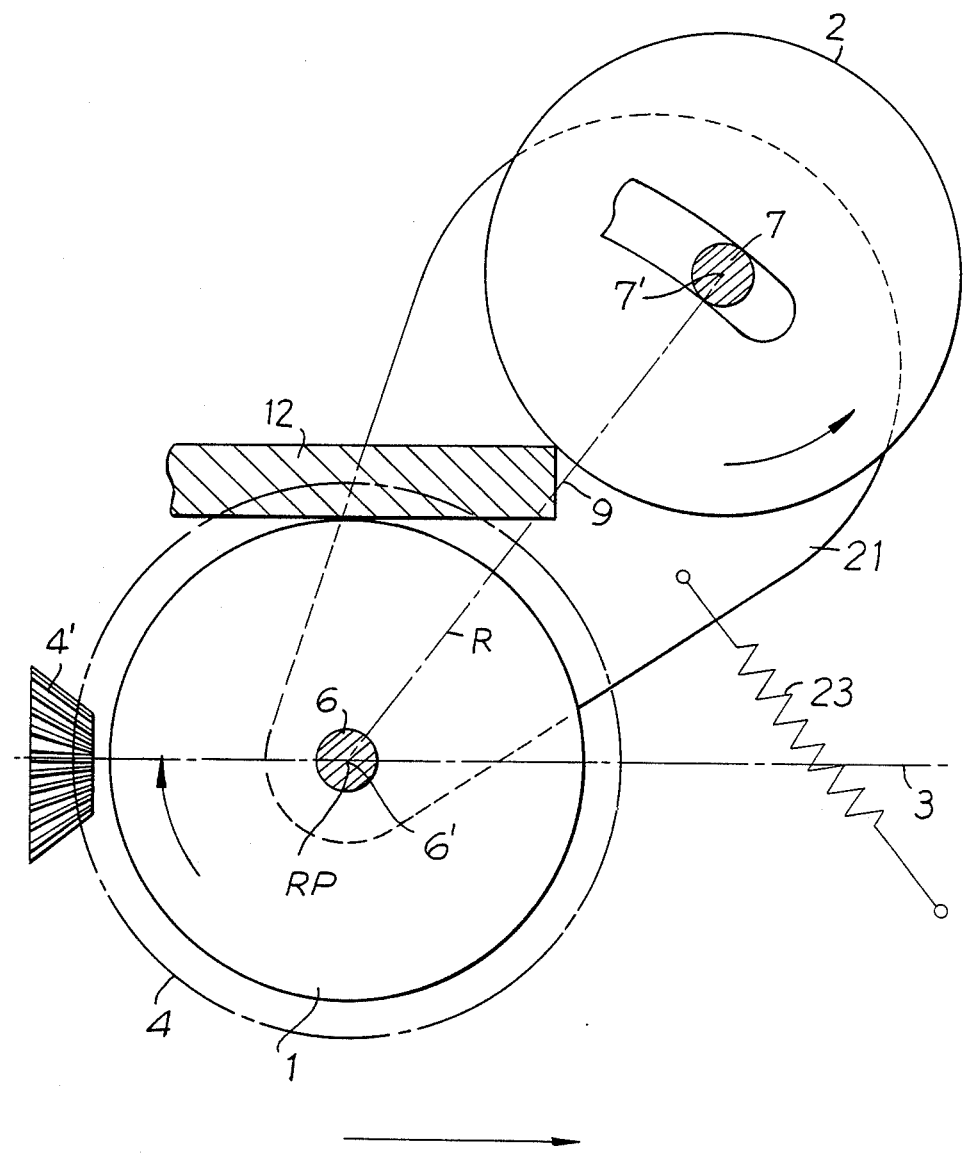
FIG. 2 is a schematic side view of another embodiment of the apparatus of FIG. 1, showing additional structural details.

Additional details are shown in FIG. 2. In the embodiment of FIG. 1, the upper roller 2 is urged to its lowest point 13 by its own weight; however, in the embodiment shown in FIG. 2 the upper roller 2 is urged downward by the spring element 23 which is connected to a pivotable lever 21 in which the upper roller 2 is mounted. The upper roller bearing 7 is mounted in the pivotable lever 21. The pivot point rp of the pivotable lever 21 in this embodiment is coincident with the center point 6, of the lower roller bearing 6 of the lower roller 1.

The gear-tooth system is also shown in more detail in FIG. 2. Cone or bevel bears 4', mounted coaxially on the drive axle 3 which extends longitudinally, engage the bevel gearing (pitch diameter 4) on the lower roller 1 to drive it in this embodiment.

It will be understood that each of the elements described above, or two or more together, may also find a useful application in other types of structures differing from the types described above.

While the invention has been illustrated and described as embodied in a method and apparatus for conveying plate-like parts or objects of very different thickness, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. In an apparatus for continuously conveying a plate-like object, especially a circuit board, having a variable thickness in a substantially horizontal direction, comprising an upper roller, having an upper roller bearing and an associated lower roller, having a lower roller bearing with a bearing center point between which said plate-like object is guided, and a gear-tooth system, having a plurality of gear teeth for driving said upper roller by said lower roller, the improvement wherein said gear-tooth system is structured to provide a constant axial spacing between said lower roller and said upper roller, and a circular arc-shaped coulisse is provided, having an arc center point and an arc radius, said upper roller bearing of said upper roller has a corresponding number of said gear teeth being mounted in said circular arc shaped coulisse, said arc center point of said circular arc-shaped coulisse is positioned at said bearing center point of said lower roller, and said arc radius corresponds to said axial spacing provided by said gear-tooth system.

2. The improvement according to claim 1, wherein said coulisse is structured so that said upper roller tends to take its lowest position by its own weight and said upper roller and said lower roller need not always be entirely vertically above each other.

3. The improvement according to claim 1, further comprising a spring element connected with said upper roller so that said upper roller is drawn continuously in the direction of its lowest allowed position.

4. The improvement according to claim 1, wherein said gear-tooth system between said lower roller and said upper roller is engaged with one end of said rollers.

5. The improvement according to claim 1, wherein said gear-tooth system between said lower roller and said upper roller is engaged with both ends of said rollers.

6. The improvement according to claim 1, further comprising a single additional lower roller mounted directly downstream from said lower roller in said horizontal direction for processing said circuit board.

7. The improvement according to claim 1, further comprising a pivotable lever whose pivot point is identical with said bearing center point of said lower roller, said upper roller bearing being mounted on said pivotable lever.

8. A method for conveying a plate-like object, especially a circuit board, having a variable thickness in a substantially horizontal continuous treatment process, comprising the steps of:
   a. feeding said plate-like object between an upper roller and an associated lower roller, said upper roller being driven by said associated lower roller by a gear-tooth system;
   b. maintaining a constant axial spacing between said upper roller and said lower roller; and
   c. constraining said upper roller to follow a circular-arc shaped path to adjust to different thicknesses of said plate-like object, an arc center point of said circular arc-shaped path being coincident with a bearing center point of said lower roller.

9. A method according to claim 8, further comprising the step of urging said upper roller continuously downward by a spring element.

* * * * *